3,087,966
PREPARATION OF ALKYLCYCLOHEXYLAMINES

Vernon A. Currier and Philip H. Moss, Austin, Tex., assignors to Jefferson Chemical Company, Inc., Houston, Tex., a corporation of Delaware
No Drawing. Filed Sept. 9, 1958, Ser. No. 759,846
3 Claims. (Cl. 260—563)

The present invention relates to higher amines and to their method of manufacture. In particular, it concerns the mono-, and dialkyl primary and secondary cyclohexylamines, having an alkyl radical of at least 8 carbon atoms, and their method of preparation. The amines of this invention may be represented by the formula:

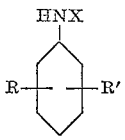

in which R is an alkyl radical having from 8 to 24 carbon atoms, R' is hydrogen or an alkyl radical having from 1 to 24 carbon atoms, and X is hydrogen or a ring alkylated cyclohexyl group having the formula:

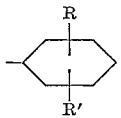

in which R and R' have the same values noted above.

The higher alkylcyclohexylamines have not been commercially available heretofore. These materials are generally water-white mobile liquids at room temperature having relatively high boiling points. They are insoluble in water but are completely miscible in organic solvents such as methanol, ethanol, ether, benzene, dioxane and acetone.

The higher alkylcyclohexylamines, as defined above, have valuable and unexpected properties. They have been found particularly useful as repellants for rodents, such as rats and field mice, and repellency indices of 98% at a 2% concentration, and 90.4% at a 0.5% concentration have been achieved by certain of these amines. Methylation and quaternization of these alkylcyclohexylamines produce cationic compounds of the type:

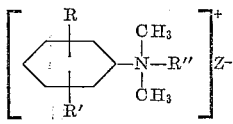

where R and R' have the values noted above, R" is methyl, benzyl, hydroxyethyl and Z is chloride or bromide. These materials are wetting, foaming and emulsifying agents. They also function as antistatic agents for plastics and textiles. Alkylene oxide derivatives of the higher alkylcyclohexylamines are another class of valuable antistatic agents. The higher alkylcyclohexylamines are also valuable as corrosion inhibitors and as flotation agents.

In accordance with one embodiment of this invention, an alkylphenol, represented by the formula:

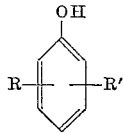

in which R is an alkyl radical having from 8 to 24 carbon atoms and R' is hydrogen or an alkyl radical having from 1 to 24 carbon atoms, is reacted with hydrogen in the presence of or in contact with a hydrogenation catalyst at an elevated temperature and pressure to produce the corresponding alkylcyclohexanol. The alkylcyclohexanol in turn is reacted with ammonia at an elevated temperature and pressure in the presence of hydrogen and a hydrogenation catalyst for a time sufficient to effect at least a 50% conversion of the alkylcycohexanol to the corresponding alkylcyclohexylamine.

Typical alkylphenols which may be reacted according to this process to produce alkyl-substituted primary and secondary cyclohexylamines include nonylphenol, dinonylphenol, tertiary octylphenol, nonylcresol, dodecylphenol, dodecylcresol, octadecyl- and titradecylphenol. Particularly desirable feed materials are the nonyl and dodecyl alkylphenols where the alkyl radicals were obtained from methyl-branched $C_9$ and $C_{12}$ propylene polymers, i.e. trimers or tetramers.

In conducting the reaction, the alkylphenol feed is charged into a vessel suitable for effecting the reaction at an elevated temperature and pressure. After the charge is introduced, the vessel is generally purged with hydrogen followed by the introduction of the hydrogenation catalyst. Hydrogen is then initially added in an amount from about 10 to 30 atmospheres at temperatures ranging from 20° to about 60° C. Hydrogenation of the alkylphenol takes place at a moderately elevated temperature under a positive pressure of hydrogen. Generally, it has been found desirable to conduct this step at a temperature ranging from about 100° to about 225° C. and a pressure ranging from about 10 to 150 atmospheres. The hydrogenation step is normally completed in a relatively short time and the reaction vessel is cooled and vented.

Thereafter, ammonia is charged to the reaction vessel and a positive pressure of hydrogen pressured into the vessel. Ammonolysis of the alkylcyclohexanol is then conducted at an elevated temperature and pressure in the presence of a hydrogenation catalyst.

Ammonolysis is normally conducted at a temperature somewhat higher than that employed for hydrogenation. Thus ammonolysis may be conducted at a temperature ranging from about 180° to 280° C., the range from about 230° to about 260° C. being preferred.

This reaction is also conducted at an above atmospheric pressure which may rnage from about 30 to about 400 atmospheres. The presence of hydrogen is essential to effect ammonolysis in the presence of a hydrogenation catalyst and accordingly there should be a positive pressure of hydrogen present. The process is more effective at a hydrogen partial pressure of at least about 10 atmospheres, the preferred range being from about 30 to about 200 atmospheres.

Ammonia is, of course, essential to effect ammonolysis. Theoretically a mol of ammonia for each mol of alkylcyclohexanol should be adequate. It has been found, however, that the molar amount of ammonia should substantially exceed the molar quantity of the alkylcyclohexanol and should be in the order of at least about 4 mols of ammonia per mol of alkylcyclohexanol.

It will be appreciated that under the conditions of the ammonolysis step, there will be considerable production of secondary alkylcyclohexylamines along with the primary alkylcyclohexylamine. Surprisingly, it has been discovered that the use of exceedingly high molar ratios of ammonia to alkylcyclohexanol, e.g. ammonia to alkylcyclohexanol mol ratios in the order of 15:1, unexpectedly and sharply reduced the proportion of secondary alkylcyclohexylamine thereby considerably enhancing the yield of the primary alkylcyclohexylamine product. This effect takes place with ammonia to alkylcyclohexanol mol ratios in excess of 10 mols to 20 or 25 mols of ammonia per mol of alkylcyclohexanol, the preferred mol ratio being about 15:1. Thus, while ammonia to alkylcyclohexanol mol ratios may range from an amount in excess of 1:1 to about 25:1, the preferred range is from an amount in excess of 10:1 to about 20:1.

Hydrogenation catalysts are essential in this process and a large number of such catalysts may be employed in either the hydrogenation or the amination steps described above. The metal hydrogenation catalysts and their oxides are good catalysts with a more desirable group consisting of the metals and oxides of copper, nickel and cobalt, and mixtures thereof. These catalysts may be employed with a promoter from the group consisting of chromium oxide, molybdenum oxide, manganese oxide, thorium oxide, calcium oxide, calcium carbonate, aluminum oxide, iron oxide, magnesium oxide, magnesium carbonate, barium carbonate and the rare earth oxides and carbonates. Mixed catalysts may conveniently be prepared by igniting and oxidizing mixtures of the corresponding metal nitrate and carbonate salts.

Preferred catalysts are the mixed nickel, copper and chromium oxide catalysts having compositions expressed in atom percent of 44 to 94% nickel, 5–55% copper and 1–5% chromium, and the cobalt-magnesium oxide catalyst having cobalt-magnesium mol ratios of about 73:27. A specific preferred catalyst composition consists of 75% NiO, 22% CuO and 3% $Cr_2O_3$.

The various catalyst compositions may be carried on an inert support such as silica, filtros and alumina. They may also be employed in the absence of a support for effecting reaction in either a batch process or in a fixed bed continuous flow system.

The foregoing reaction may be conducted in the presence of solvent for the alkylphenol and alkylcyclohexanol, it being understood that only solvents inert to the reactants under the conditions employed here are suitable. Solvents which have been successfully employed include isopropyl ether and dioxan.

The following examples illustrate the practice of this invention:

EXAMPLE I 110 grams of nonylphenol (0.5 mol) and 15 grams of a nickel, copper, chromia catalyst (61% nickel, 12% copper and 1.37% chromium) were charged to an autoclave reaction vessel. The reactor was flushed with hydrogen and sealed. The vessel was heated and the reaction conducted at 160–185° C. under 600–1000 p.s.i.g. (pounds per square inch gauge). On completion of this step, the reaction products comprising nonylcyclohexanol were cooled and the vessel vented. The vessel still containing the nonylcyclohexanol and other reaction products was charged with 113 grams (7.5 mols) of ammonia and pressured to 350 p.s.i.g. at 23° C. with hydrogen. The amination reaction was then carried out at 240–260° C. under a pressure of 2700–3500 p.s.i.g. for three hours. The cooled reaction product was filtered with the aid of tetrahydrofuran to remove the catalyst and distilled to separate the products of the reaction. The yield of nonylcyclohexylamine was 75% and the yield of di-(nonylcyclohexyl)amine was 12% by weight based on the nonylphenol consumed. The nonylcyclohexylamine was recovered boiling at 129–138° C. at 3 mm. of mercury pressure absolute.

Nonylcyclohexylamine was tested for its repellent ability for rodents. In a food acceptance test with rats it had a repellency index of 98.1% at a 2% concentration and 90.4% at a 0.5% concentration (complete repellency =100%). In a barrier evaluation test, 5 mg./sq. in. of nonylcyclohexylamine on burlap gave a 75% reduction in damage from house mice.

EXAMPLE II

The reactions of nonylphenol were repeated under conditions similar to those of Example I above except that the amination step was conducted at 280° C. and the ammonia to nonylphenol mol ratio was varied in order to observe the effect of varying the mol ratio. The results are compared in Table I below:

Table I

| Run No. | A | B |
| --- | --- | --- |
| Ammonia/nonylphenol mol ratio | 4 | 15 |
| Low boiling amine, percent | 1.0 | 1.8 |
| Nonylcyclohexylamine, percent | 50 | 77.5 |
| Di(nonylcyclohexyl)amine, percent | 43.6 | 12.1 |

The foregoing results illustrate the striking change in the relative proportion of nonylcyclohexylamine to di(nonylcyclohexyl)amine brought about by sharply increasing the molar ratio of ammonia to nonylphenol. Thus, the 5:4 proportion of nonylcyclohexylamine to di(nonylcyclohexyl)amine was stepped up to a 6:1 ratio when the molar proportion of ammonia to nonylphenol was increased to 15:1.

EXAMPLE III 128 grams (0.566 mol) of nonylcyclohexanol, obtained as in Example I, were charged to an autoclave with 15 grams of a hydrogenation catalyst consisting of 61% nickel, 12% copper and 1.4% chromium. The vessel was purged and then charged with 8.6 mols of ammonia and hydrogen to an initial pressure of 500 p.s.i.g. at 32° C. The reaction was carried out at 260° C. for three hours. The reaction product was distilled with the resultant recovery of 77% by weight of nonylcyclohexylamine and 15% by weight of di(nonylcyclohexyl)amine.

EXAMPLE IV 0.47 mol of t-octylphenol and 35–40 grams of a hydrogenation catalyst having the composition 60.7% Ni, 12.2% Cu and 1.37% Cr were charged to an autoclave. The reactor was flushed out and then pressured with hydrogen and heated. The hydrogenation reaction was conducted at 155–165° C. and 2000 p.s.i.g. (pounds per square inch gauge) for about one hour. After this reaction, the products were cooled and the vessel vented. 6.47 mols of ammonia were added plus enough hydrogen to bring the pressure to 400 p.s.i.g. The vessel was sealed and the contents reacted at 260° C. and 345° p.s.i.g. for three hours. After this step, the reaction products were separated from the catalyst by filtration and subjected to distillation. 48.6 grams of 4-tert-octyl-cyclohexylamine amounting to a 47% yield were recovered in a fraction boiling in the range 103–105° C./1 mm., refractive index $n_d^{20}$ 1.4770, and equivalent weight of 207 as compared to the theoretical of 211. The calculated figures for 4-tert-octyl-cyclohexylamine are C=79.55, H=13.82, N=6.63; found by analysis C=79.66, H=13.97, N=6.53.

EXAMPLE V 115 grams (0.333 mol) of dinonylphenol were reacted with hydrogen at a temperature of 180–205° C. and a pressure of 550–1000 p.s.i.g. in the same manner described in Example I for nonylphenol to produce dinonylcyclohexanol. The cooled vented reaction vessel was then charged with 85 grams (5 mols) of ammonia and pressured with hydrogen to an initial pressure of 550 p.s.i.g. at 40° C. The amination reaction was then conducted at 240° C. and 2500 p.s.i.g. for three hours. The reaction products were cooled, the catalyst removed and the products recovered by distillation. The yield of 2,4-dinonycyclohexylamine was 85.3% by weight and 5.2% of di(2,4-dinonylcyclohexyl)amine based on the amount of charge consumed.

EXAMPLE VI

Dodecylphenol was hydrogenated with a nickel-copper-chromia catalyst at 140–180° C. and 2000–3000 p.s.i.g. hydrogen pressure to dodecylcyclohexanol. An autoclave was charged with 79 g. of this alcohol, 75 g. of ammonia and 10 g. of a cobalt-magnesium oxalate catalyst containing 73 mol percent cobalt and 27 mol percent magnesium.

The catalyst was prepared by reducing coprecipitated oxalates at 400° in hydrogen. The initial pressure was raised to 200 p.s.i.g. with hydrogen at 25° C. The reaction was then conducted at 260° C. under a pressure of 3900 p.s.i.g. for two hours. By distillation there was recovered 0.21 mol of dodecylcyclohexylamine representing a 73% yield. There was a 7% yield of dodecylcyclohexane and a minor amount of unreacted dodecyclcyclohexanol. The product distilled at 131–139° C. at one mm., had an equivalent weight of 287 and was completely soluble in dilute acetic acid.

The following example illustrates an additional novel feature in applicants' process whereby a nonylphenol was converted to nonylcyclohexylamine in a one step process thereby avoiding the two steps heretofore thought necessary to preparing these materials.

EXAMPLE VII 0.5 mol of nonylphenol, 7.5 mols of ammonia and 20 g. of a nickel-copper-chromia catalyst were heated at 230–270° C. under about 5000 p.s.i.g. of hydrogen. After four hours, the reaction vessel was cooled and the contents distilled. There was isolated 0.3 mol of nonylcyclohexylamine boiling in the range of 88–112° C. at 0.3 mm. (mostly at 95° C.) indicating a substantial yield of a nonylcyclohexylamine by this one step process.

Obviously, many modifications and variations of the invention as hereinbefore set forth may be made without departing from the spirit and scope thereof, and therefore, only such limitations should be imposed as are indicated in the appended claims.

We claim:
1. A method for preparing alkylcyclohexylamines which comprises reacting an alkylphenol with hydrogen at an elevated temperature and pressure in the presence of a hydrogenation catalyst selected from the group consisting of the metals and oxides of nickel, copper and cobalt and mixtures thereof; to form an alkylcyclohexanol, and aminating said alkylcyclohexanol with ammonia, in the presence of hydrogen and said hydrogenation catalyst at an elevated temperature and above atmospheric pressure up to about 400 atmospheres, said alkylphenol being represented by the formula

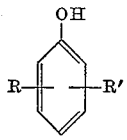

in which R is an alkyl radical having from 8 to 24 carbon atoms and R' is selected from the group consisting of hydrogen and an alkyl radical having from 1 to 24 carbon atoms, the mol ratio of said ammonia to said cyclohexanol being in excess of 10:1, said amination reaction being conducted with a hydrogen partial pressure between 10 and 200 atmospheres and a temperature ranging from about 180° to about 280° C.

2. A method for preparing higher monoalkylcyclohexylamines which comprises reacting an alkylphenol in which said alkyl group has from 8 to 24 carbon atoms with hydrogen at a temperature from about 100° to about 225° C. at an above atmospheric pressure up to about 150 atmospheres and in the presence of a hydrogenation catalyst selected from the group consisting of the metals and oxides of nickel, copper and cobalt and mixtures thereof to form an alkylcyclohexanol, and aminating said alkylcyclohexanol with ammonia, in the presence of hydrogen and said hydrogenation catalyst at a temperature in the range from about 180° to about 280° C. and a pressure ranging from about 30 to about 400 atmospheres, the mol ratio of said ammonia to said alkylcyclohexanol being in the range of 10:1 up to 25:1.

3. A method for preparing higher mono-alkylcyclohexylamines which comprises reacting an alkylphenol in which said alkyl group has from 8 to 24 carbon atoms, defined hereinbelow, with hydrogen and ammonia, the mol ratio of said ammonia to said alkylphenol being in the range of 10:1 up to 25:1, in the presence of a hydrogenation catalyst selected from the group consisting of the metals and oxides of nickel, copper and cobalt and mixtures thereof and at a temperature in the range of 180° to about 280° C. at an above atmospheric pressure up to about 400 atmospheres, said alkylphenol being represented by the formula

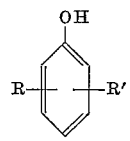

in which R is an alkyl radical having from 8 to 24 carbon atoms and R' is selected from the group consisting of hydrogen and an alkyl radical having from 1 to 24 carbon atoms.

References Cited in the file of this patent

UNITED STATES PATENTS

| | | |
|---|---|---|
| 1,982,985 | Ernst et al. | Dec. 4, 1934 |
| 2,161,322 | Steindorff et al. | June 6, 1939 |

FOREIGN PATENTS

| | | |
|---|---|---|
| 306,414 | Great Britain | May 19, 1930 |
| 342,662 | Great Britain | July 30, 1929 |
| 255,968 | Switzerland | Feb. 1, 1949 |

OTHER REFERENCES

Skita et al.: Ber. Deut. Chem., vol. 52B, pages 1519–1535 (1919).

Guyot et al.: Bull. Soc. Chim., France, vol. 47, pages 203–210 (1930).